US006947982B1

(12) United States Patent
McGann et al.

(10) Patent No.: US 6,947,982 B1
(45) Date of Patent: Sep. 20, 2005

(54) DISTRIBUTED SESSION SERVICES

(75) Inventors: Conor McGann, Austin, TX (US); Bruce Macartney-Filgate, Austin, TX (US)

(73) Assignee: i2 Technologies US, Inc., Dallas, TX (US)

( * ) Notice: Subject to any disclaimer, the term of this patent is extended or adjusted under 35 U.S.C. 154(b) by 858 days.

(21) Appl. No.: 09/686,470

(22) Filed: Oct. 11, 2000

Related U.S. Application Data

(60) Provisional application No. 60/158,733, filed on Oct. 11, 1999.

(51) Int. Cl.[7] .................. G06F 15/173; G06F 11/00
(52) U.S. Cl. .................. 709/224; 714/4; 714/14
(58) Field of Search .................. 709/201, 224, 709/246, 227, 228, 238, 203; 714/4, 13, 14, 714/6; 707/110

(56) References Cited

U.S. PATENT DOCUMENTS

| | | | | |
|---|---|---|---|---|
| 5,408,649 A | * | 4/1995 | Beshears et al. | 714/10 |
| 5,423,037 A | * | 6/1995 | Hvasshovd | 707/202 |
| 5,544,077 A | * | 8/1996 | Hershey | 702/58 |
| 5,566,299 A | * | 10/1996 | Billings et al. | 714/4 |
| 5,633,999 A | * | 5/1997 | Clowes et al. | 714/6 |
| 5,708,780 A | | 1/1998 | Levergood et al. | 709/229 |
| 5,809,250 A | | 9/1998 | Kisor | 709/227 |
| 5,829,019 A | * | 10/1998 | Thompson et al. | 711/113 |
| 5,961,601 A | * | 10/1999 | Iyengar | 709/229 |
| 6,018,805 A | | 1/2000 | Ma et al. | 714/4 |
| 6,076,108 A | | 6/2000 | Courts et al. | 709/227 |
| 6,085,220 A | * | 7/2000 | Courts et al. | 709/201 |
| 6,098,093 A | | 8/2000 | Bayeh et al. | 709/203 |
| 6,256,641 B1 | * | 7/2001 | Kasi et al. | 707/202 |
| 6,334,114 B1 | * | 12/2001 | Jacobs et al. | 705/26 |
| 6,490,624 B1 | * | 12/2002 | Sampson et al. | 709/227 |
| 6,496,824 B1 | * | 12/2002 | Wilf | 707/10 |
| 6,539,494 B1 | * | 3/2003 | Abramson et al. | 714/4 |
| 6,557,038 B1 | * | 4/2003 | Becker et al. | 709/227 |
| 6,560,717 B1 | * | 5/2003 | Scott et al. | 714/4 |
| 6,622,167 B1 | * | 9/2003 | Keesey et al. | 709/219 |
| 6,622,265 B1 | * | 9/2003 | Gavin | 714/38 |
| 2003/0169732 A1 | * | 9/2003 | Bakke | 370/360 |
| 2004/0048234 A1 | * | 3/2004 | Allen et al. | 434/350 |

OTHER PUBLICATIONS

Liechenstein et al., File Server System Reliability Versus Level of Inactive and Active Parallel Standby Redundancy, 1994, IEEE,pp. 2482-2485.*
International Search Report for PCT/US00/28129 dated Dec. 20, 2000.
PCT—Notification of Transmittal of the International Search Report or the Declaration, 7 pages, Feb. 2, 2004.

* cited by examiner

Primary Examiner—Larry D. Donaghue
(74) Attorney, Agent, or Firm—James E. Walton; Brian E. Harris

(57) ABSTRACT

A remote session server, or bank of remote session servers, is provided to a bank of web servers. Each web server maintains a cache that contains all of the session information for all sessions being serviced by that server. The web server utilizes its local cache to perform all session services. The remote session server maintains a copy of all session information from all caches, and is updated whenever changes are made on each web server. If a web server should go down, an ongoing session can be transferred to a different web server. In such event, the new web server is able to obtain the previous status of the session from the remote web server and continues serving the session in a transparent manner.

20 Claims, 3 Drawing Sheets

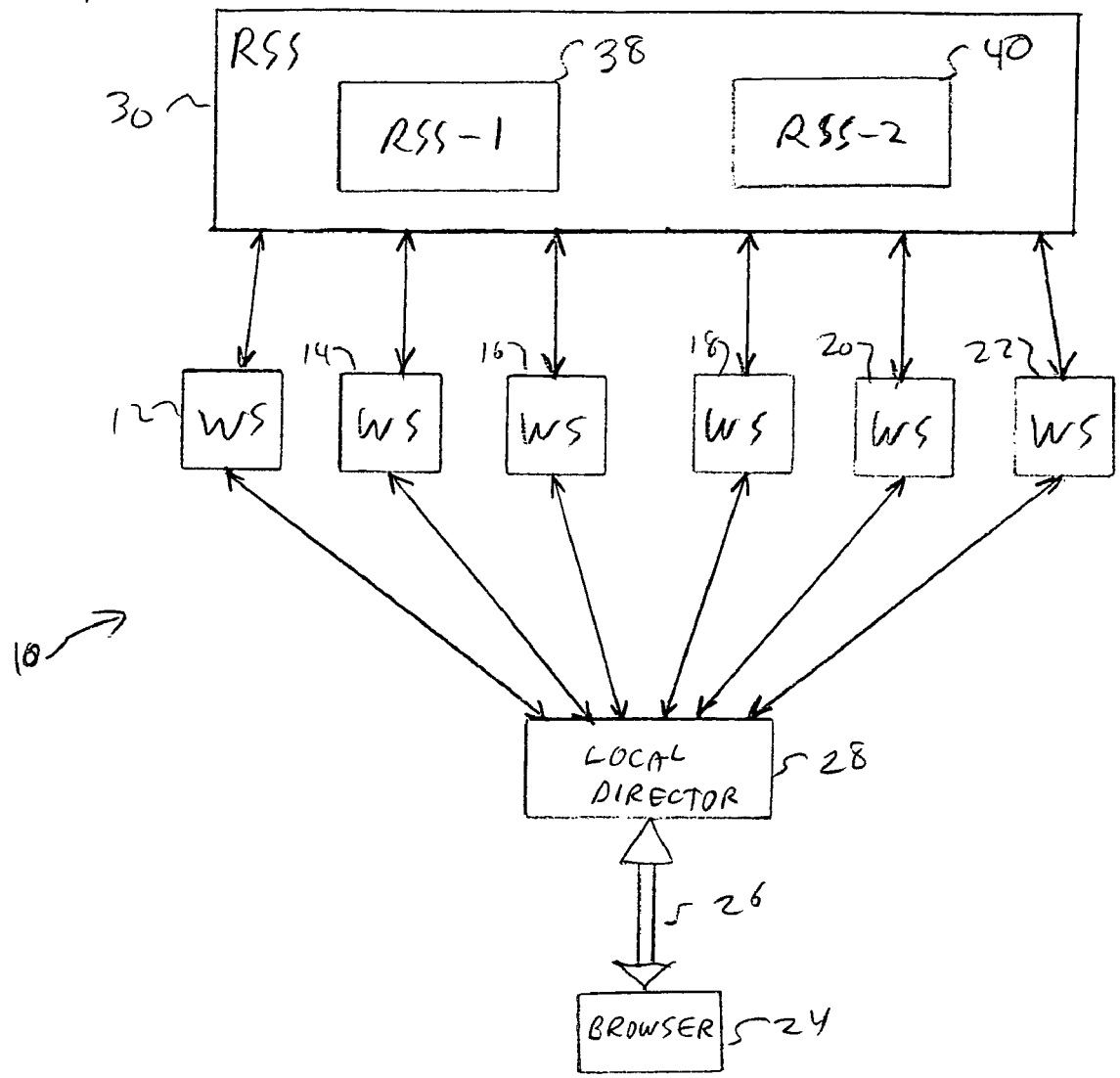

US 6,947,982 B1

DISTRIBUTED SESSION SERVICES

CROSS-REFERENCE TO RELATED APPLICATION

This application claims the benefit of U.S. Provisional Application No. 60/158,733, filed Oct. 11, 1999.

BACKGROUND OF THE INVENTION

1. Field of the Invention

The present invention relates generally to computer communication systems, and more specifically to a method and system for managing session level services over a complex Internet service application.

2. Description of the Prior Art

Use of publicly available communication systems such as the Internet is currently increasing at a rapid rate. Many companies find it extremely valuable to be able to provide information to customers and other entities over such communication systems. In particular, web pages are made publicly available, and typically accessed by widely available browsers.

Because a large number of people may wish to access a company's information simultaneously, it is becoming more common to provide a bank of web servers that can operate in parallel. Each web server has access to the underlying corporate information as is well known in the art, and each can handle a number of sessions simultaneously.

Each connection between a remote browser and the underlying system can be termed a session. A session is, generally, a series of requests from a browser to a web system that make up an interaction with the characteristics of a conversation. The system retains data as the interaction continues (known as session data) that enables the system to remember what has been done in earlier stages of the interaction. Use of sessions is known to those skilled in the art. The web hosting system, containing several web servers in parallel, maintains information on each of these sessions in order to provide appropriate communications with the remote browser.

An example of a system which uses a bank of web servers in this matter is described in detail in U.S. Pat. No. 6,076,108, issued to Courts et al., and assigned to i2 Technologies, Inc. The method and system set forth in this patent utilizes a global session server (GSS), which maintains information on all of the sessions currently running on the host system. A single session server, or a bank of such session servers, are used to provide session information to each workstation so that a proper response can be made to request by remote browsers.

Some systems have a drawback in that under heavy loads it is difficult to maintain a high level of performance. Also, the system described therein is not as fault tolerant as might be desired.

It would be desirable to provide an improved system and method for providing session services for a bank of web servers that is both very fast, and provides a high level of fault tolerant to insure a high level of system availability.

SUMMARY OF THE INVENTION

In accordance with the present invention, a remote session server, or bank of remote session servers, is provided to a bank of web servers. Each web server maintains a cache that contains all of the session information for all sessions being serviced by that server. The web server utilizes its local cache to perform all session services. The remote session server maintains a copy of all session information from all caches, and is updated whenever changes are made on each web server. If a web server should go down, an ongoing session can be transferred to a different web server. In such event, the new web server is able to obtain the previous status of the session from the remote web server and continues serving the session in a transparent manner.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is an alternative embodiment of the system in FIG. 2 that includes multiple remote session servers.

DESCRIPTION OF THE PREFERRED EMBODIMENT

The system and method of the present invention is an improvement to the global session server described in detail in U.S. Pat. No. 6,076,108. However, it will be understood by those skilled in the art that the described technique for providing a remote session server can be adapted to any system using a plurality of web servers to handle Internet or similar communications.

The information stored for each session will be implementation dependent, and is known by those skilled in the art. For example, session data can typically include information such as the user profile, status of the session, history of events in the session, and particular information pertinent to the session such as an identification of items in a shopping cart for purchases being made by the remote user. Identification and maintenance of such information is well known by those skilled in the art, and will not be described further herein.

Figure 1:
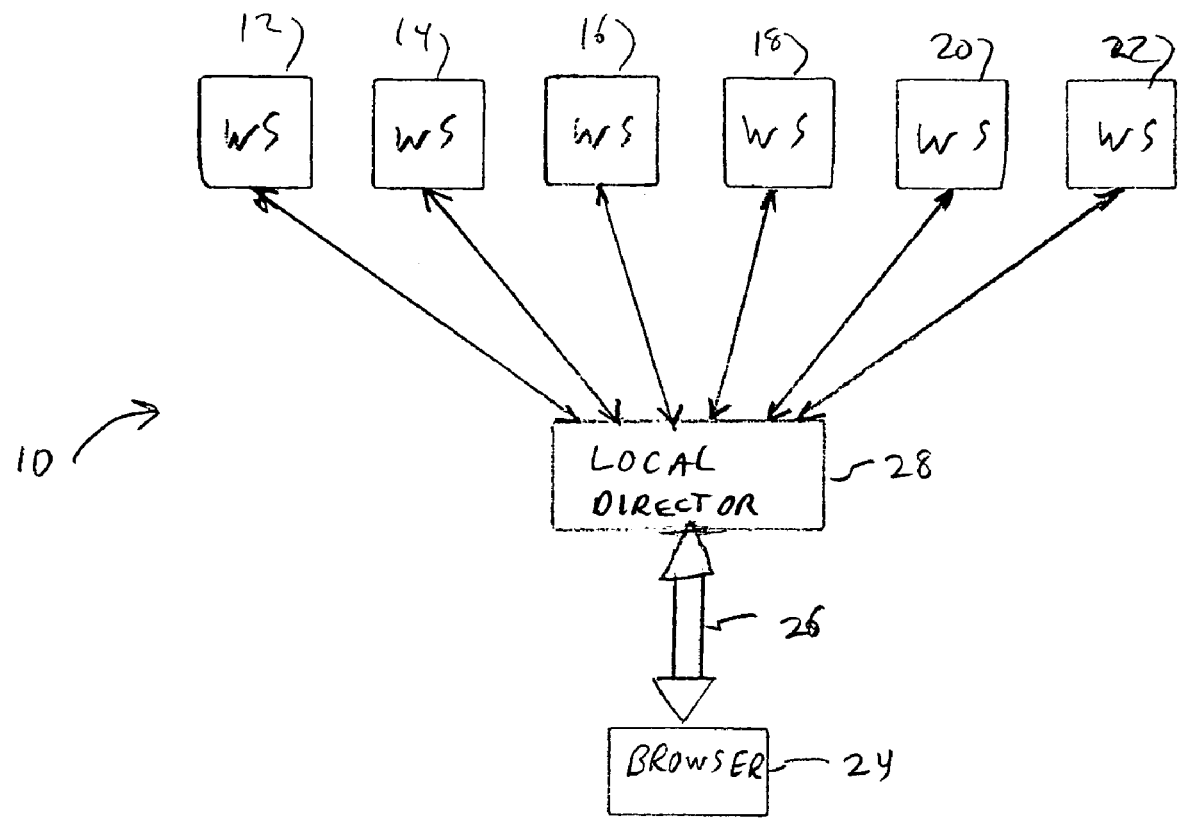
FIG. 1 is a block diagram of a system containing a plurality of web servers.

Referring to FIG. 1, a host system designated generally as reference number 10 includes a plurality of web servers 12, 14, 16, 18, 20, 22. A browser connect 24 connects to one of the web servers 12–22 over an internet connection 26 which is routed through a local director 28. As known in the art, local director 28 directs all communications from incoming IP addresses to selected servers 12–22. This may be through the use of a table, or other algorithm, that distributes communications with connected IP addresses to particular web servers 12–22. Local director 28 functions to keep a specific browser connected to a specific web server to optimize access to a session for normal operation.

In prior art systems, as exemplified by U.S. Pat. No. 6,076,108, each web server 12–22 communicates with a separate global session server that contains all session information. When an event occurs which requires access to such session information, such as display of a web page requested by a browser 24, access must be made to the global session server. However, in the preferred technique, each web server 12–22 maintains all of its session service information on the same hardware system that provides the remaining web services.

Figure 2:
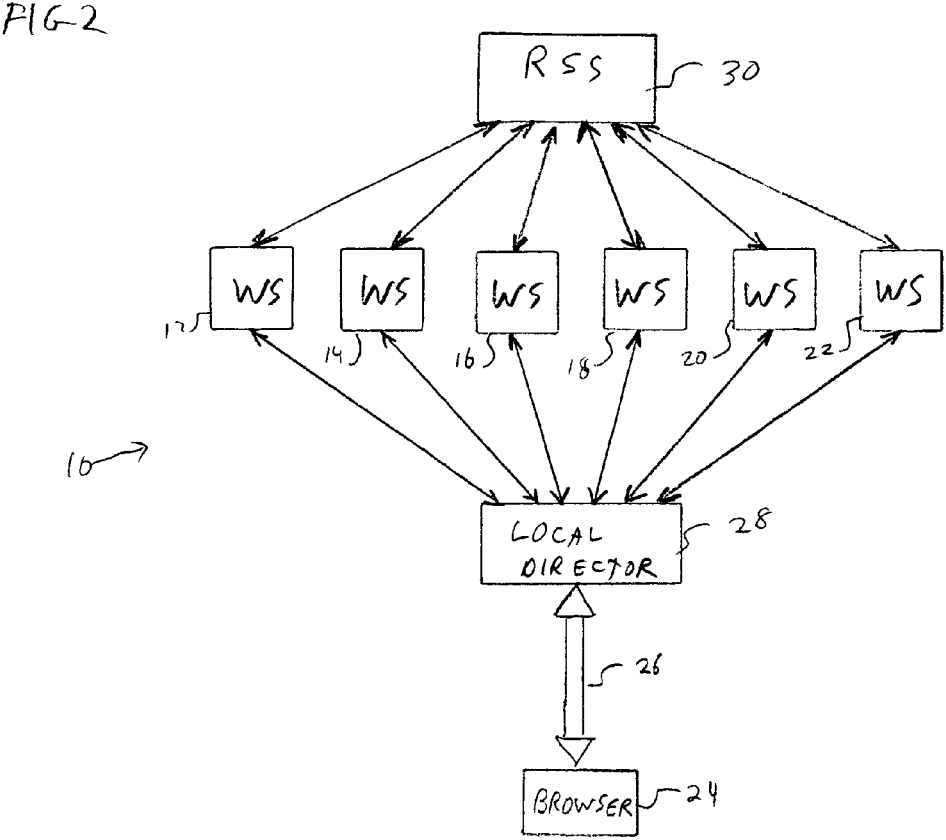
FIG. 2 is a block diagram of the system of FIG. 1 including a remote session server.

Referring to FIG. 2, a remote session server 30 is provided which communicates with all of the web servers 12–22. Remote session server 30 is provided to keep track of, and maintain a backup for, all of the session information on each of workstations 12–22.

Figure 3:
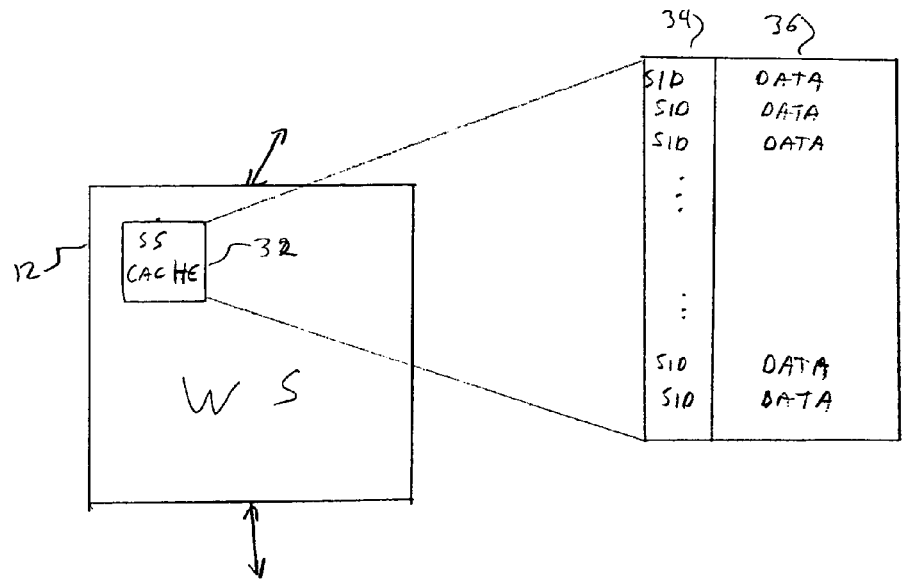
FIG. 3 is a partial block diagram of one of the web servers in FIGS. 1 and 2.

Referring to FIG. 3, workstation 12 is illustrated in more detail. Contained within workstation 12 is a session server cache 32, which contains all of the session ID's (SID) 34 which are being handled by web server 12. For each session ID 34, all session data 36 which is maintained on behalf of the web server is maintained within session cache 32. Thus, when a request is made by a particular session, web server 12–22 contained locally all information needed to respond to the request. It is not necessary to obtain session information from any remote location.

However, whenever session information within cache 32 is updated by any web server, a copy of such update is communicated to remote session server 30. Thus, remote session server 30 contains a complete set of all session information for all sessions on all web servers.

If a particular web server should go down, all sessions on that web server must be handled elsewhere. When a web server goes down, local director 28 becomes aware of that fact and re-routes sessions, based upon IP addresses, to alternate web servers. When sessions that were connected to the failed web server make subsequent requests, their session data is retrieved by the alternate servers from the remote session server. If a web server goes down, changes to the session will be lost if the web server goes down before those changes have been updated in the remote server. In that case, the session will be available on the alternate server, but the session will not be completely current.

For example, assume web server 16 goes down while running 100 simultaneous sessions. At the time web server 16 goes down, a complete copy of its session cache 32 was stored on remote session server 30. Some recent information may be lost if the crash of web server 16 prevents the last few cache updates being written to remote session server 30, but all sessions should otherwise be reasonably current.

Using whatever algorithm is implemented in local director 28, all of the sessions that were on web server 16 are re-routed to one of the other web servers the next time a communication is received. In some systems, a standby web server can be used; in others already operating web servers will take over the load from the system that went down. In either event, when local director 18 routes an interrupted session to a new web server, for example web server 12, the web server is initially unprepared to handle the transferred session.

Before responding to the transferred session the first time, web server 12 obtains from remote session server 30 a copy of the session information for the transferred SID. Once this data is transferred from remote session server 30, workstation 12 is ready to manage the session from the point at which workstation left it.

In the system shown in the Figures, if remote session server 30 goes down, all of the web servers 12–22 continue functioning. In other words, the remote session server 30 is not a single failure point that will bring down the entire system. Once remote session server 30 is brought back up, all of the web servers 12–22, which have been handling their sessions properly in the meantime, will update all of their changed sessions to remote session server 30. In the scheme shown in FIG. 2, if a web server should go down while remote session server 30 is unavailable, the current status of all sessions on that web server will be lost. In order to provide addition robustness to the system, remote session server 30 can be implemented as a bank of separate machines.

Referring to FIG. 4, remote session server 30 is actually composed of two separate pieces of hardware, servers 38, 40. Each workstation 12–22 maintains an identifier indicating which RSS 38, 40 maintains its session data backups. If an RSS 38, 40 used by a particular workstation should go down, that workstation connects to another RSS within the bank making up remote session server 30, and provides it a complete copy of its session information cache 32. In this manner, all sessions are properly handled even if problems should be encountered in one or more web servers, and one or more servers in the remote session server bank 30, simultaneously.

When a workstation goes down, and a session its moved to a new workstation, the new workstation will need to poll the individual machines within the remote session server 30 in order to determine which one has that session data. Once the proper machine is found, the new workstation downloads the session data and continues as described above.

Within each workstation, it is possible for multiple updates to be attempted to the data for a single session. For example, if two frames for a session try to update at the same time, the remote session server 30 is not updated until both updates are made. By locking the data for a particular SID whenever an update is made, multiple updates will be automatically serialized. If an attempt is made to obtain a lock to update session information, and that session is already locked, the update will be retained in a queue until the previous update is completed. Only when all pending updates for a particular SID have been made will the corresponding session information be transferred from the workstation to the remote session server 30 to provide the remote update.

The described system and method provides for a bank of web servers that provide excellent performance because all of the session information needed by each server is maintained locally. In addition, by backing up the local information cache to a remote session server, a session is maintained even if its hosting web server should go down. By providing a bank of remote session servers, even a failure of one of the machines in the remote session server bank will not terminate a session.

While the invention has been particularly shown and described with reference to a preferred embodiment, it will be understood by those skilled in the art that various changes in form and detail may be made therein without departing from the spirit and scope of the invention.

What is claimed is:

1. A system for providing web services, comprising:
   a plurality of web servers capable of hosting web browsing sessions, each session having session data associated therewith, each web server operable to:
      store all of the session data for each session hosted by the web server; and
      host each session without accessing session data from a remote location unless the web server is hosting the session for another web server that has failed;
   a local director connected to a communications link and to the web servers, wherein the local director routes requests, each associated with a session, from remote browsers to a web server hosting the associated session; and at least two remote session servers, each connected to a corresponding one or more of the plurality of web servers and operable to store a copy of the session data that is stored on its corresponding one or more web servers such that the session data for its corresponding one or more web servers is backed up on the remote session server;

the system operable to, when a particular one of the at least two remote session servers goes down, for each session for which a copy of its session data was stored on the particular remote session server, copy the session data for that session from the web server hosting that session to another remote session server of the at least two remote session servers such that the session data for that session will continue to be backed up on a functioning remote session server.

2. The system of claim 1, wherein each web server has a local cache of session data for all sessions hosted on that web server.

3. The system of claim 1, wherein each separate remote session server in the at least two remote sessions servers stores session data for a subset of sessions that does not overlap the subset of any other separate remote session server in the at least two remote session servers.

4. The system of claim 1, wherein at least one of the separate remote session servers in the at least two remote session servers is operable to store a copy of session data of sessions that is also stored on at least one other remote session server in the at least two remote session servers such that the copies of the session data on the at least two remote session servers overlap.

5. The system of claim 1, wherein a particular web server is operable to:
receive, substantially simultaneously, a plurality of updates to session data stored on the particular web server for a particular session hosted by the particular web server;
queue the plurality of substantially simultaneously received updates;
lock the session data for the particular session while updating the session data with each update in the plurality of updates such that the updates are made serially; and
communicate a copy of the updated session data stored on the particular web server to the remote session server corresponding to the particular web server only after all pending updates to the session data have been made.

6. A method for providing web session services, comprising:
connecting each of a plurality of web sessions to a corresponding one of a plurality of web servers, each web server hosting a plurality of the web sessions;
on each web server, caching all session data for each session hosted on that web server and hosting each session without accessing the session data from a remote location unless the web server is hosting the session for another web server that has failed;
copying the cached session data on each web server to one or more of at least two remote session servers, each remote session server corresponding to one or more of the plurality of web servers and storing a copy of the session data that is cached on its corresponding one or more web servers such that the session data for its corresponding one or more web servers is backed up on the remote session server; and
copying, when a particular one of the at least two remote session servers goes down, for each session for which a copy of its session data was stored on the particular remote session server, the session data for that session from the web server hosting that session to another remote session server of the at least two remote session servers such that the session data for that session will continue to be backed up on a functioning remote session server.

7. The method of claim 6, further comprising:
when a web server goes down, transferring the sessions that such web server was hosting to others of the web servers; and
for each transferred session, copying session data for that session from the remote session server to a web server to which the session was transferred.

8. The method of claim 6, wherein the session data for each of the plurality of sessions is copied to at least two different separate remote session servers such that the copies of the session data stored on the at least two remote session servers overlap.

9. The system of claim 1, wherein:
when a particular web server fails, the local director is operable to assign the sessions being hosted by the particular web server to one or more different web servers; and
the remote session server is operable provide the session data for the sessions being hosted by the particular web server to the one or more different web servers.

10. The system of claim 9, wherein the different web server comprises a standby web server operable to handle sessions of web servers that have failed.

11. The method of claim 6, further comprising:
when a particular web server fails, assigning the sessions being hosted by the particular web server to one or more different web servers; and
providing, from the remote session server, the session data for the sessions being hosted by the particular web server to the one or more different web servers.

12. The method of claim 11, wherein the different web server comprises a standby web server operable to handle sessions of web servers that have failed.

13. The method of claim 6, further comprising:
receiving, substantially simultaneously, a plurality of updates to session data stored on a particular web server for a particular session hosted by the particular web server;
queuing the plurality of substantially simultaneously received updates;
locking the session data for the particular session while updating the session data with each update in the plurality of updates such that the updates are made serially; and
communicating a copy of the updated session data stored on the particular web server to the remote session server corresponding to the particular web server only after all pending updates to the session data have been made.

14. Software for providing web session services, the software being embodied in one or more computer-readable media and when executed using a computer system operable to:
connect each of a plurality of web sessions to a corresponding one of a plurality of web servers, each web server hosting a plurality of the web sessions;
on each web server, cache all session data for each session hosted on that web server and host each session without accessing the session data from a remote location unless the web server is hosting the session for another web server that has failed;

copy the cached session data on each web server to one or more of at least two remote session servers, each remote session server corresponding to one or more of the plurality of web servers and storing a copy of the session data that is cached on its corresponding one or more web servers such that the session data for its corresponding one or more web servers is backed up on the remote session server, and copy, when a particular one of the at least two remote session servers goes down, for each session for which a copy of its session data was stored on the particular remote session server, the session data for that session from the web server hosting that session to another remote session server of the at least two remote session servers such that the session data for that session will continue to be backed up on a functioning remote session server.

15. The software of claim 14, further operable to:

when a web server goes down, transfer the sessions that such web server was hosting to others of the web servers; and for each transferred session, copying session data for that session from the remote session server to a web server to which the session was transferred.

16. The software of claim 14, wherein the session data for each of the plurality of sessions is copied to at least two different separate remote session servers such that the copies of the session data stored on the at least two remote session servers overlap.

17. The software of claim 14, further operable to:

when a particular web server fails, assign the sessions being hosted by the particular web server to one or more different web servers; and provide, from the remote session server, the session data for the sessions being hosted by the particular web server to the one or more different web servers.

18. The software of claim 17, wherein the different web server comprises a standby web server operable to handle sessions of web servers that have failed.

19. The software of claim 14, further operable to:

receive, substantially simultaneously, a plurality of updates to session data stored on a particular web server for a particular session hosted by the particular web server;

queue the plurality of substantially simultaneously received updates;

lock the session data for the particular session while updating the session data with each update in the plurality of updates such that the updates are made serially; and communicate a copy of the updated session data stored on the particular web server to the remote session server corresponding to the particular web server only after all pending updates to the session data have been made.

20. A system for providing web services, comprising:

means for connecting each of a plurality of web sessions to a corresponding one of a plurality of web servers, each web server hosting a plurality of the web sessions;

means for, on each web server, caching all session data for each session hosted on that web server and hosting each session without accessing the session data from a remote location unless the web server is hosting the session for another web server that has failed;

means for copying the cached session data on each web server to one or more of at least two remote session servers, each remote session server corresponding to one or more of the plurality of web servers and storing a copy of the session data that is cached on its corresponding one or more web servers such that the session data for its corresponding one or more web servers is backed up on the remote session server; and means for copying, when a particular one of the at least two remote session servers goes down, for each session for which a copy of its session data was stored on the particular remote session server, the session data for that session from the web servers hosting that session to another remote session server of the at least two remote session servers such that the session data for that session will continue to be backed up on a functioning remote session server.

* * * * *